(12) United States Patent
McCormick et al.

(10) Patent No.: US 9,586,643 B2
(45) Date of Patent: *Mar. 7, 2017

(54) PORTABLE CONVEYANCE WITH TOWING GUIDE ASSEMBLY

(71) Applicant: Probity Cell LLC, Holdrege, NE (US)

(72) Inventors: Robert McCormick, Holdrege, NE (US); Zhenghua Kong, Vernon Hills, IL (US); Wei Chang, Buffalo Grove, IL (US); Yazhao Wang, Suzhou (CN); Kai Wang, Suzhou (CN)

(73) Assignee: Probity Cell LLC, Holdrege, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,299

(22) Filed: Jun. 15, 2016

(65) Prior Publication Data

US 2016/0297494 A1    Oct. 13, 2016

Related U.S. Application Data

(63) Continuation of application No. 14/639,810, filed on Mar. 5, 2015, now Pat. No. 9,376,158.

(51) Int. Cl.
*B62K 15/00* (2006.01)
*B62H 1/12* (2006.01)
*B62K 3/00* (2006.01)

(52) U.S. Cl.
CPC ............ *B62K 15/006* (2013.01); *B62K 3/002* (2013.01); *B62K 2015/005* (2013.01)

(58) Field of Classification Search
CPC ...... B62K 3/002; B62K 15/006; B62K 13/08; B62K 2015/005; A63C 17/004; B62H 1/12; B62H 7/00; A45C 2009/005
See application file for complete search history.

(56) References Cited

U.S. PATENT DOCUMENTS

| 2,118,640 | A | * | 5/1938 | Bergen | B62K 3/002 280/221 |
| 2,629,611 | A | * | 2/1953 | Covington | B62H 1/12 188/106 R |
| 5,417,444 | A | * | 5/1995 | Chen | A63C 17/004 280/7.15 |

(Continued)

OTHER PUBLICATIONS

'Electricmood,' 2015, [online][Retrieved on Feb. 19, 2016]; Retrieved from the Internet URL: http://www.electricmood.com/presentation; 2 pages.

(Continued)

*Primary Examiner* — Bryan Evans
(74) *Attorney, Agent, or Firm* — Fish & Richardson P.C.

(57) ABSTRACT

A portable conveyance has a deck, a front drive wheel proximately disposed to a first end of the deck and a rear drive wheel attached proximate to a second end of the deck. A guide roller assembly attached proximate to the rear drive wheel. The guide roller assembly has a first rotational axis and the rear drive wheel rotates about a second rotational axis different from the first rotational axis and parallel to the first rotational axis, such that the guide roller assembly is not in contact with a substantially flat surface when the first and rear drive wheels are in contact with the substantially flat surface, and the guide roller assembly is in rotational contact with the surface when the deck is lifted into a towing position.

15 Claims, 9 Drawing Sheets

(56) References Cited

U.S. PATENT DOCUMENTS

| | | | |
|---|---|---|---|
| 6,481,729 B2* | 11/2002 | Herman | B62K 15/006 280/87.041 |
| 6,991,243 B2* | 1/2006 | Boyle | B62K 3/002 280/47.371 |
| 7,967,095 B2 | 6/2011 | Kosco | |
| 8,465,033 B2 | 6/2013 | Benarrouch | |
| 9,079,627 B1* | 7/2015 | Ibon | B62K 3/002 |
| 2002/0089137 A1 | 7/2002 | Chang | |
| 2002/0096849 A1* | 7/2002 | Bang | A63C 17/26 280/87.041 |
| 2005/0230933 A1 | 10/2005 | Woo | |
| 2007/0158928 A1 | 7/2007 | Wu | |
| 2008/0185812 A1 | 8/2008 | Liu | |
| 2012/0326408 A1* | 12/2012 | Bellon | B62B 17/065 280/87.041 |
| 2015/0197305 A1* | 7/2015 | Boes | B62K 3/002 180/15 |

OTHER PUBLICATIONS

'Indiegogo Electricmood: The World Smartest Urban E-Scooter,' 2016, [online][Retrieved on Feb. 19, 2016]; Retrieved from the Internet URL: https://www.indiegogo.com/projects/electricmood-the-world-smartest-urban-scooter; 21 pages.

'Surf Monkey Bikes, The Stigo, another foldable electric scooter,' 2014, [online][Retrieved on Feb. 19, 2016]; Retrieved from the Internet URL: http://cleanrider.com/stigo-another-foldable-electric-scooter/; 5 pages.

'Stigo gives you ultimate commuting freedom,' 2016, [online][Retrieved on Feb. 19, 2016]; Retrieved from the Internet URL: http://stigobike.com; 5 pages.

* cited by examiner

PORTABLE CONVEYANCE WITH TOWING GUIDE ASSEMBLY

CROSS-REFERENCE TO RELATED APPLICATIONS

This application is a continuation application of, and claims priority to, U.S. patent application Ser. No. 14/639,810, entitled "Portable Conveyance with Towing Guide Assembly," filed on Mar. 5, 2015 and which issued as U.S. Pat. No. 9,376,158 on Jun. 28, 2016. The disclosure of the foregoing application is incorporated herein by reference in its entirety for all purposes.

BACKGROUND

This specification relates to portable conveyances, and in particular to folding portable conveyances.

Portable conveyances are very popular forms of transportation. Initially such conveyances were recreational in nature. However, with the advent of environmental awareness and a concomitant acceptance of alternative forms of transportation, many people now use portable conveyances for portions of their commutes to and from their working locations. Portable conveyances are especially popular for "first and last" mile commuting. For example, a person may use a portable conveyance to travel from her home to a metro rail station, and then collapse the portable conveyance into a storage and towing configuration that allows the user to more easily transport the conveyance onto the rail car. The person may thereafter use the portable conveyance to travel from her destination rail station to her place of work. Finally, while at work, the person may store the conveyance in the collapsed configuration in her office during the work day.

Existing portable conveyances still have several drawbacks, however. For example, many of the devices are heavy and tow on one wheel, and the user must "balance" the conveyance while towing. Thus, when a user tows the conveyance for a long distance, the user may become fatigued. Alternatively, some portable conveyances have two rear drive wheels that also serve as tow wheels. This configuration, however, has a larger rear-wheel footprint than for single rear-wheel portable conveyances, which, in turn, requires more storage space.

Additional, the user typically must lean the conveyance against a resting surface, such as a wall, when the conveyance is stored. As the conveyance is typically soiled from dirt, rain, etc., and is also heavy, leaning the conveyance against a wall will eventually soil the wall and damage the surface of the wall.

SUMMARY

In general, one innovative aspect of the subject matter described in this specification can be embodied in an apparatus that includes a deck defining a longitudinal axis and first and second ends disposed along the longitudinal axis; a front drive wheel proximately disposed to the first end of the deck and a rear drive wheel attached proximate to a second end of the deck, and wherein the deck defines a substantially planar support surface upon which a rider of the personal conveyance is supported while riding the personal conveyance; a guide roller assembly attached proximate to the rear drive wheel, wherein the guide roller assembly has a first rotational axis and the rear drive wheel rotates about a second rotational axis different from the first rotational axis and parallel to the first rotational axis, such that the guide roller assembly is not in contact with a substantially flat surface when the first and rear drive wheels are in contact with the substantially flat surface, and the guide roller assembly is in rotational contact with the surface when the deck is lifted into a towing position.

In general, one innovative aspect of the subject matter described in this specification can be embodied in an apparatus that includes a deck defining a longitudinal axis and first and second ends disposed along the longitudinal axis; a first drive wheel proximately disposed to the first end of the deck and a second drive wheel attached proximate to a second end of the deck, and wherein the deck defines a substantially planar support surface upon which a rider of the personal conveyance is supported while riding the personal conveyance; a steering tube having a first end attached to one of the drive wheels and a steering handle attached to a second end of the steering tube; a tow handle mounted proximate to one of the drive wheels, wherein the tow handle facilitates the lifting of the deck into the towing position, the tow handle mounted separate from the steering tube and steering handle; and a guide roller assembly attached proximate to the drive wheel that is opposite the drive wheel to which the tow handle is proximately mounted, wherein the guide roller assembly has a first rotational axis and the drive wheel to which the guide roller assembly is proximately mounted rotates about a second rotational axis different from the first rotational axis and parallel to the first rotational axis, such that the guide roller assembly is not in contact with a substantially flat surface when the first and rear drive wheels are in contact with the substantially flat surface, and the guide roller assembly is in rotational contact with the surface when the deck is lifted into a towing position.

Particular embodiments of the subject matter described in this specification can be implemented so as to realize one or more of the following advantages. A multi-point towing configuration results in a balanced, stable load, which reduces user fatigue that results from resisting rotational moments of single-point towing devices. The device may be stored upright on a horizontal surface without the need of lateral support, which reduces the storage footprint that would be required with lateral support. Furthermore, marring, scuffing and soiling of a lateral support surface is eliminated. Additionally, the use of a guide roller assembly that is not in contact with the surface when the portable conveyance is being ridden by the user reduces material costs over conveyances that use, for example, two rear drive wheels for both driving and towing. Mounting the tow handle substantially in line with the longitudinal axis of the deck simplifies the overall folding design, reducing the necessity for frame components of curved geometries, thereby reducing overall manufacturing costs.

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements. To avoid congestion in the drawings and for brevity of description, reference numbers may not be repeated in subsequent drawings and descriptions of elements previously described may be omitted in subsequent drawings.

DETAILED DESCRIPTION

A portable conveyance has a deck, a first, front drive wheel proximately disposed to a first, front end of the deck and a second, rear drive wheel attached proximate to a second, back end of the deck. The deck defines a substantially planar support surface upon which a rider of the personal conveyance is supported while riding the personal conveyance. For example, the deck may define a standing support surface for a folding scooter.

A guide roller assembly is attached proximate to the second, rear drive wheel. The guide roller assembly has a first rotational axis and the second drive wheel rotates about a second rotational axis different from the first rotational axis and parallel to the first rotational axis. The separate rotational axes are proximately disposed such that the guide roller assembly is not in contact with a substantially flat surface when the first and second drive wheels are in contact with the substantially flat surface, and the guide roller assembly is in rotational contact with the surface when the deck is lifted into a towing position.

In some implementations, the guide roller assembly is a pair of first and second guide wheels that are respectively positioned on first and second sides of the second drive wheel. The portable conveyance may include steering tube pivotally attached to the first end of the deck and a steering tube locking apparatus that locks the steering tube in a drive position and in a separate, stowed position. When the steering tube is in the drive position, the front drive wheel is operatively positioned to be in contact with a surface with the second drive wheel so that a user may ride the portable conveyance. The steering tube includes a steering handle by which a user may steer the portable conveyance when riding. When the steering tube is in the stowed position, the steering handle, the first guide wheel and the second guide wheel define at least a three-point support stand on which the portable conveyance may be vertically stowed.

These example features and implementations, and alternative implementations, are described in more detail below.

Figure 1:
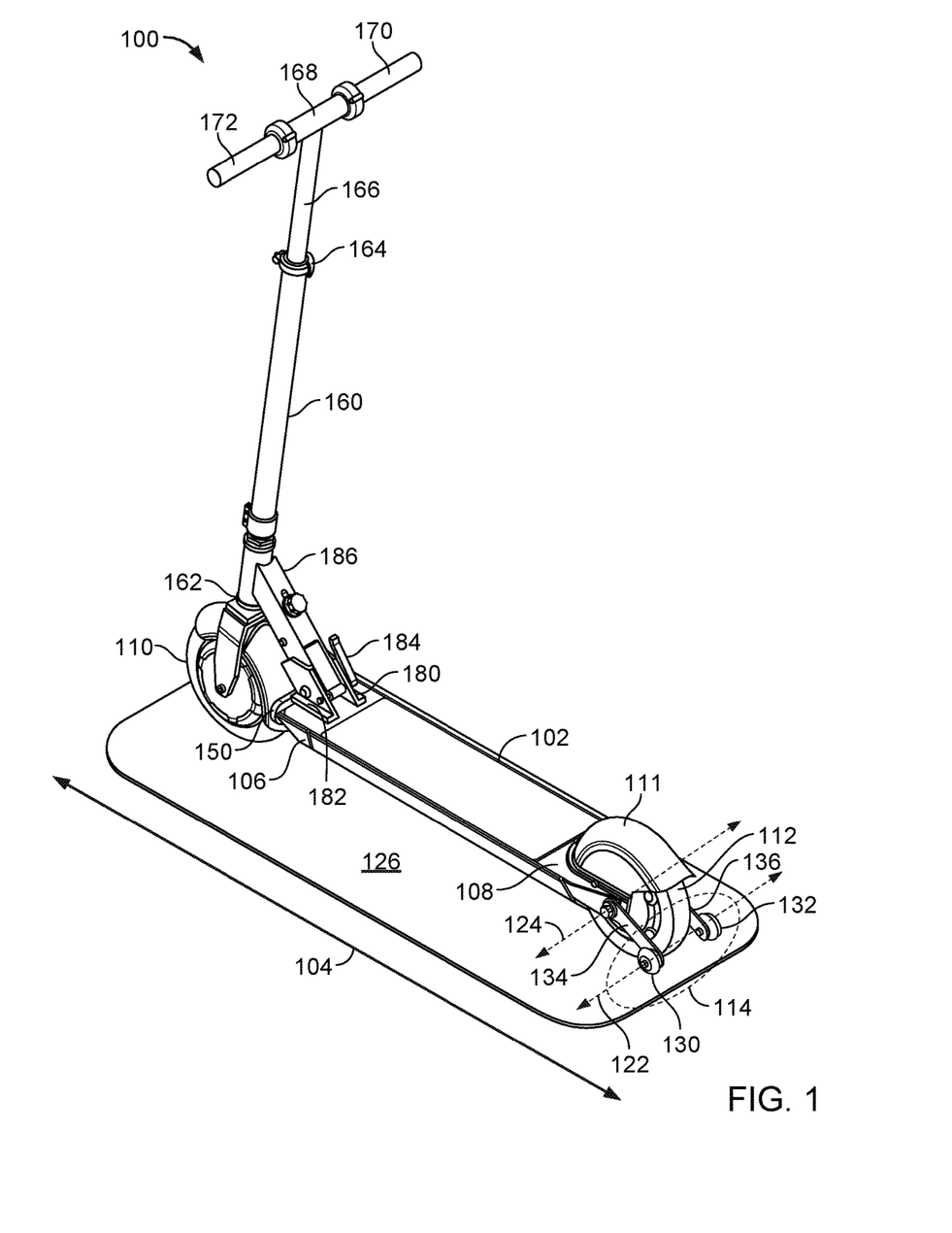
FIG. 1 is a perspective view of a portable conveyance in a riding configuration.
Figure 2:
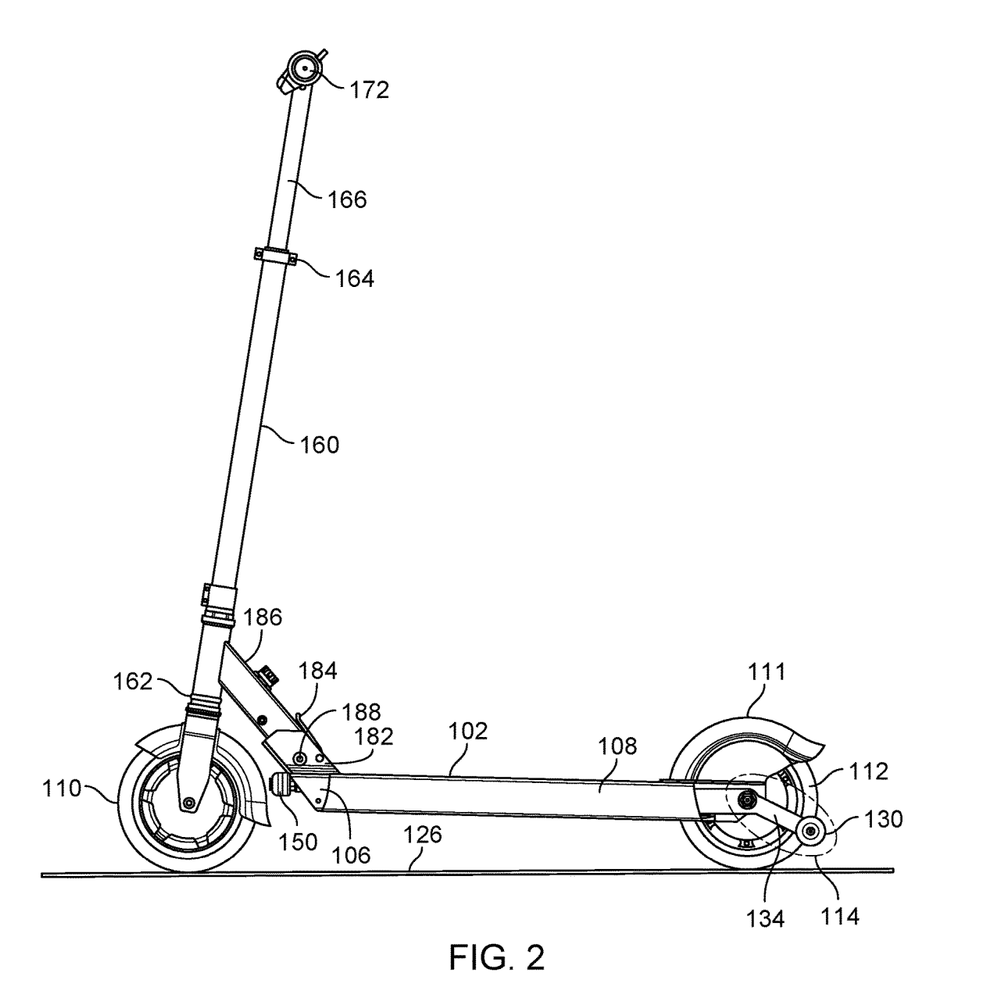
FIG. 2 is a side view of the portable conveyance in the riding configuration.
Figure 3:
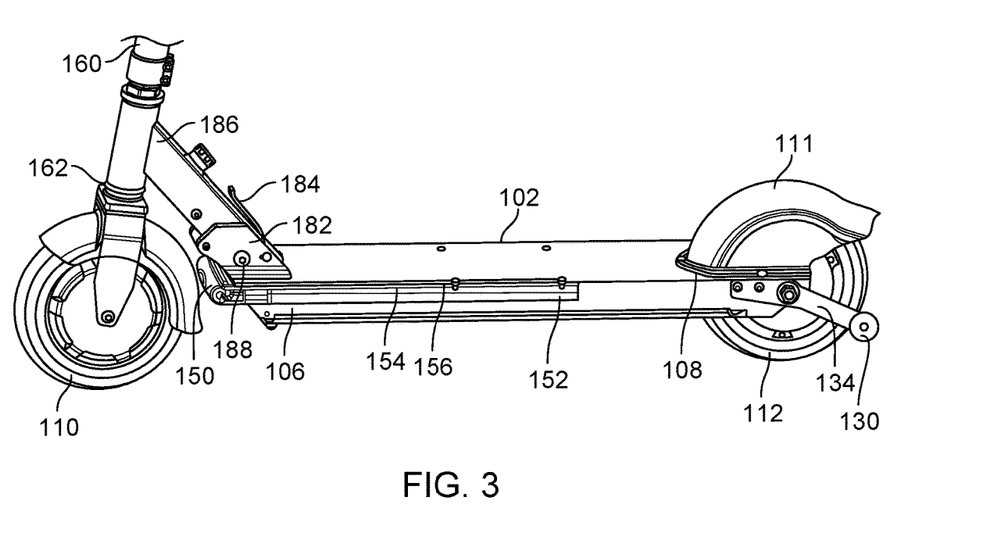
FIG. 3 is a perspective detailed view of an example tow handle assembly.

FIGS. 1, 2 and 3 are illustrations of an example implementation of a portable conveyance 100 in a riding configuration. In particular, FIG. 1 is a perspective view of a portable conveyance 100 in the riding configuration, and FIG. 2 is a side view of the portable conveyance in the riding configuration. FIG. 3 is a perspective detailed view of an example tow handle assembly, which will be described in more detail below.

The portable conveyance 100 includes a deck 102 defining a longitudinal axis 104 and first and second ends 106 and 108 disposed along the longitudinal axis 104. A first drive wheel 110 is proximately disposed to the first end 106 of the deck 102 and a second drive wheel 112 is attached proximate to the second end 108 of the deck 102.

A guide roller assembly 114 is attached proximate to the second drive wheel 112. As will be described in more detail below, there are a variety of guide roller assemblies that can be used. The guide roller assembly 114 is constructed such that the guide roller assembly 114 has a first rotational axis 122 and the second drive wheel rotates about a second rotational axis 124 that is different from the first rotational axis 122 and parallel to the first rotational axis 122. The axes are position relative to each other such that the guide roller assembly 114 is not in contact with a substantially flat surface when the first and second drive wheels are in contact with the substantially flat surface, and the guide roller assembly 114 is in rotational contact with the surface when the deck is lifted into a towing position.

Figure 4:
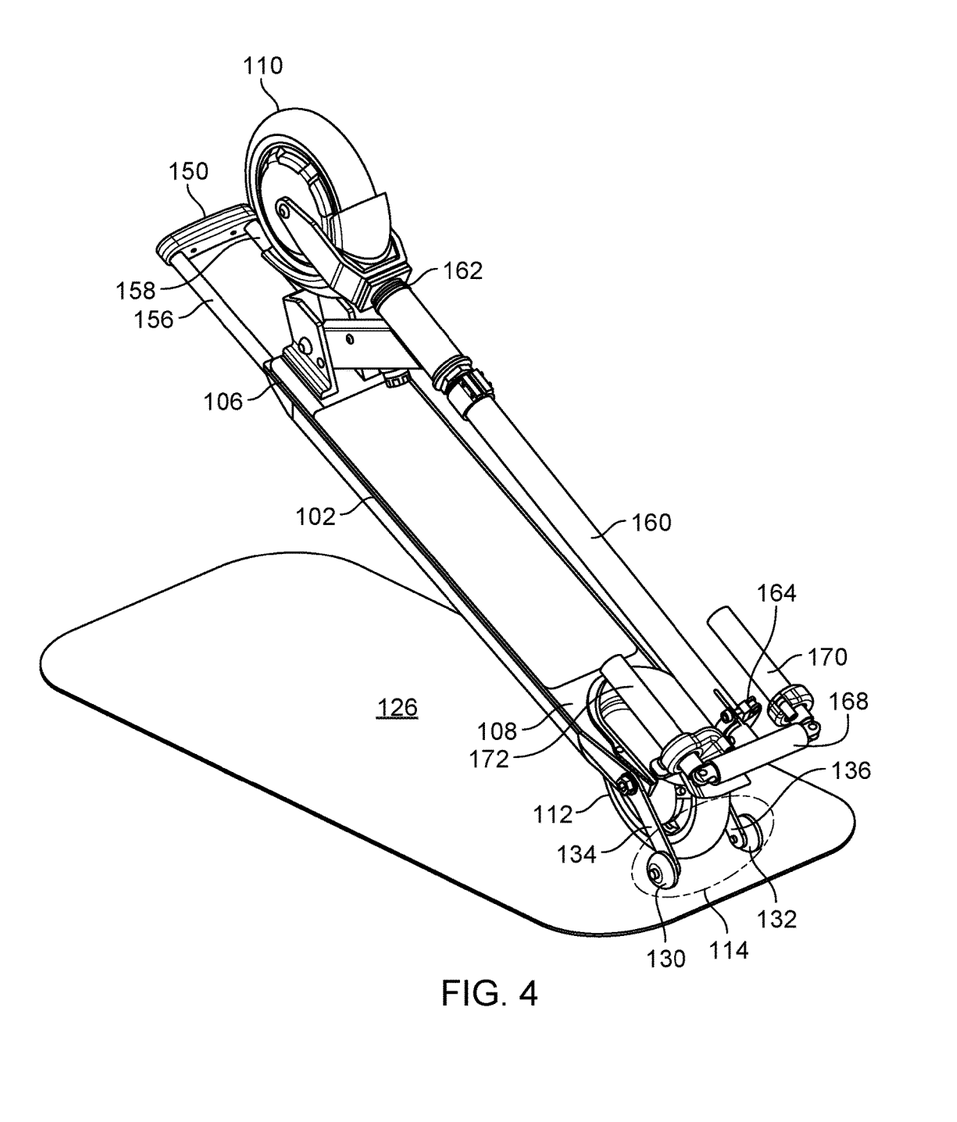
FIG. 4 is a perspective view of the portable conveyance in a towing position while in a towing configuration.
Figure 5:
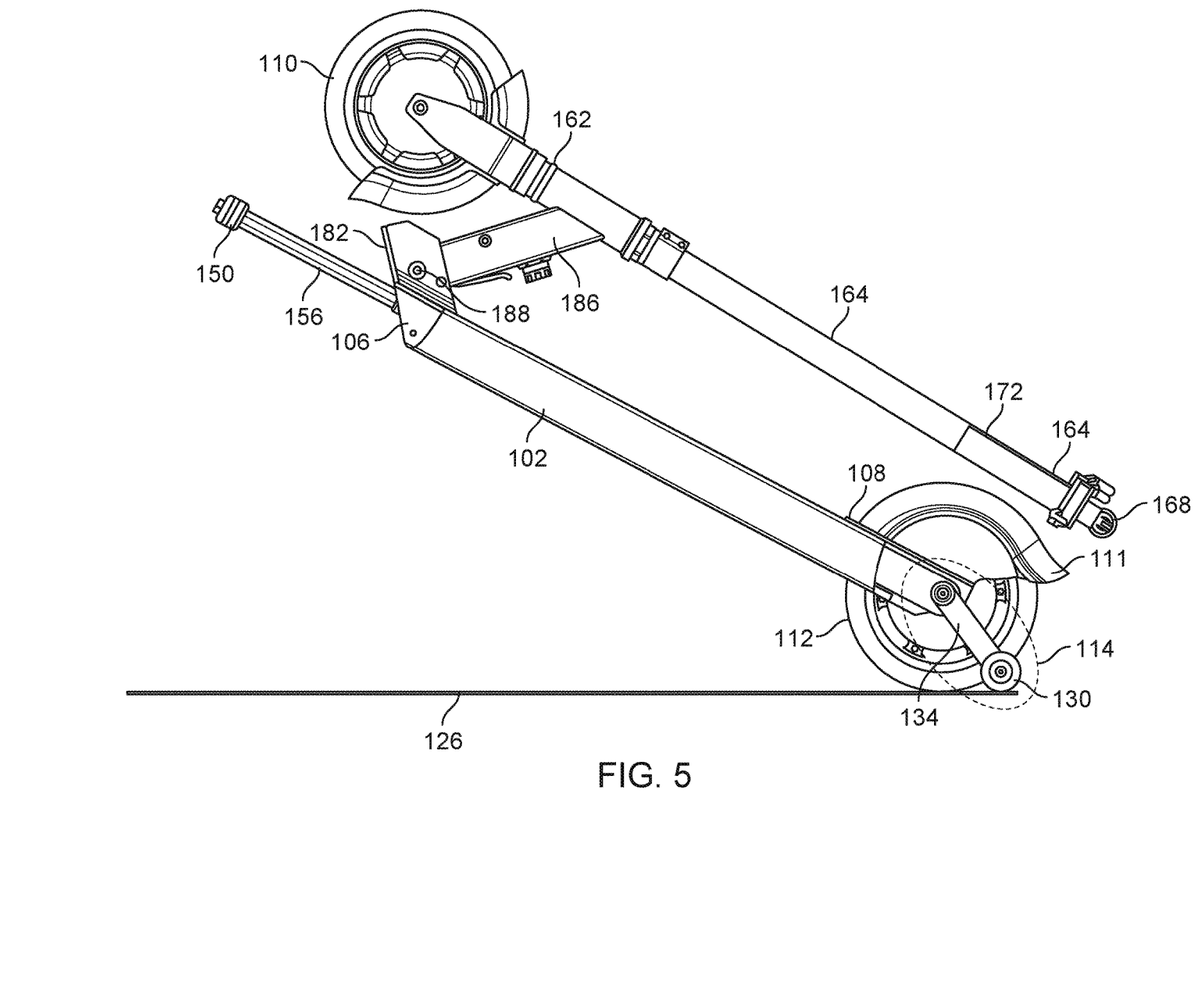
FIG. 5 is a side view of the portable conveyance in the towing position while in the towing configuration.

In the example implementation of FIGS. 1-6, a guide roller assembly 114 includes a first guide wheel 130 attached proximate to the second drive wheel 112 on a first side of the second drive wheel 112, and a second guide wheel 132 attached proximate to the second drive 112 wheel on a second side of the second drive wheel 112 that is opposite the first side of the second drive wheel 112. The guide wheels 130 and 132 are attached by respective first and second extension arm 134 and 136 that are respectively attached to first and second sides of the deck 102. The arms are angled as shown in FIG. 1 and the guide wheels are attached to distal portions of the arms such that the guide wheels are not in contact with the flat surface 126 when the first and second drive wheels 110 and 112 are in contact with the flat surface. However, as shown in FIGS. 4 and 5, when the portable conveyance 102 is lifted into a towing position, the first and second guide wheels 130 and 132 are in contact with the surface 126.

Again with reference to FIGS. 1-3, the portable conveyance 100 includes a steering tube 160 having a first end 162 and a second end 164. An inner steering tube 166 is slidably received in the steering tube 160 and has attached thereto a steering handle 168 with optionally foldable grips 170 and 172. The steering tube 160 is pivotally attached to the first end 106 of the deck 102. A variety of pivot attachments may be used. As shown in the example implementations, the steering tube 160 includes a pivot arm 186 having a first end rigidly connected to the steering tube 160 and a second end pivotally attached to the first end of the deck 102 by first and second pivot braces 180 and 182, a steering tube locking apparatus 184, and a pivot pin 188.

Figure 6:
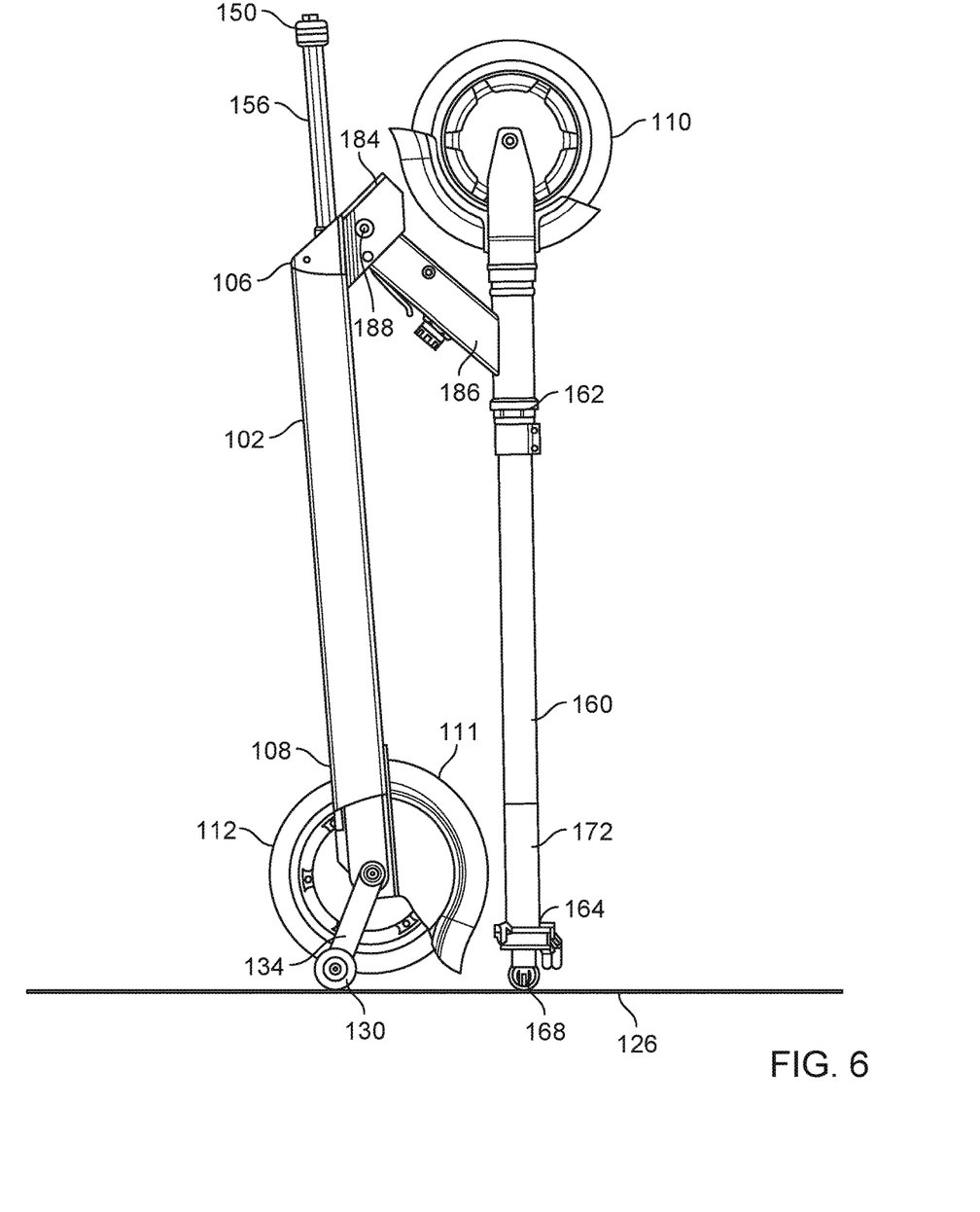
FIG. 6 is a side view of the portable conveyance in the stored position while in the towing configuration.

A variety of appropriate pivot-type locks may be used for the steering tube locking apparatus 184. The steering tube locking apparatus 184 locks the steering tube 160 in a drive position and in a separate, stowed position. FIGS. 1-3 show the steering tube locked in the drive position, and FIGS. 4-6 show the steering tube 160 locked in the stowed position. When the steering tube 160 is in the drive position, the first drive wheel 110 is operatively positioned to be in contact with the flat surface 126 with the second drive wheel 112.

When the steering tube 160 is in the stowed position, a tow handle 150 may be extended from the deck 102. As shown in FIGS. 4-6, the tow handle 150, in the extended position, can be used to tow the portable conveyance 102 by means of the guide roller assembly 114. In implementations in which the guide roller assembly is realized by a pair of guide wheels 132 and 134, the guide wheels 132 and 134, and optionally the rear drive wheel 112, are used to roll the portable conveyance 102 when it is lifted by the handle 150. In particular, the tow handle 150 is mounted proximate to the first drive wheel 110 so that the tow handle 150 facilitates the lifting of the deck 102 into the towing position of FIGS. 4 and 5.

Referring now to FIG. 2, in some implementations, when the steering tube 160 is locked in the drive position, the first drive wheel 110 is separated from the first end of the deck 106 by a first offset distance and from the tow handle by a second offset distance. As shown in FIG. 2, the second offset distance is less than the first offset distance. However, the tow handle 150 can instead be flush with the front of the deck 102, or even recede into the deck 102.

In some implementations, as shown in FIG. 3, the tow handle 150 is attached to at least one tube 156, and optionally to a second tube 158 (not shown in FIG. 3), each of which are received in respective sleeves of the deck 102. As shown in FIG. 3, the tube 156 is received in the sleeve 152. The tow handle 150 also includes a locking apparatus 154, such as detent locks or friction locks, to facilitate storage of the tow handle 150 in a stored position (as shown in FIG. 3) and in a separate extended position, as shown in FIG. 4. When in the stored position the tow handle 150 is not extended from the deck 102 and in the extended position the tow handle 150 is extended from the deck 102.

Furthermore, in some implementations, when the steering tube 160 is locked in the stowed position, the steering handle 168, the first guide wheel 130 and the second guide wheel 132 define at least a three-point support stand on which the portable conveyance 100 may be vertically stowed. For example, as shown in FIG. 6, the steering handle 168, the first guide wheel 130 and the second guide wheel 132 (not shown) form at least a three-point stand by which the portable conveyance 102 may be stored upright and without resting against a lateral support wall or other vertical surface. In the implementation shown, the three-point support stand defined by the steering handle 168, the first guide wheel 130 and the second guide wheel 132 precludes the second drive wheel 112 and the fender 111 from contacting the substantially flat surface 126 when the portable conveyance 100 is vertically stowed.

In alternative implementations, the back of the rear wheel 112 may be one of point of the at least three-point stand, the steering handle 168 may not be in contact with the surface 126 when the conveyance 100 is stored. The angles and length of the distal portions of the extension arms 134 and 136 may be selected to facilitate a variety of multi-point configurations.

Figure 7:
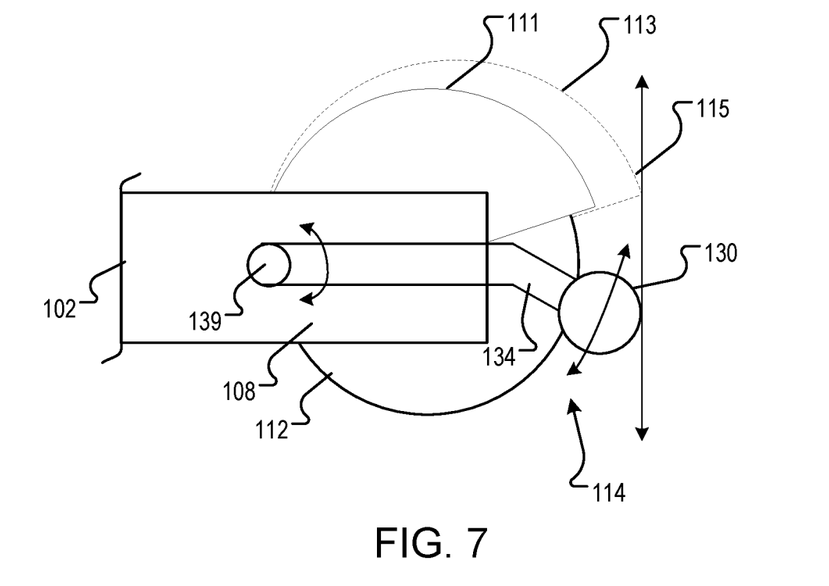
FIG. 7 is a side view illustration of an example implementations of a rear wheel fender.

Other ways of realizing a stable, multi-point storage base can also be used, examples of which are described with reference to FIG. 7, which is a side view illustration of an example implementations of a rear wheel fender. In some implementations, the fender 113, as illustrated in phantom, may be extended such that a distal portion 115 forms one point of the multi-point storage base.

Additionally, in some implementations, the first and second extension arms 134 and 136 are flexibly attached to the first and second sides of the deck 102 by a flexible attachment 139. Such attachments can include a pivot connection with a spring torsion, for example. The pivotal attachments 130 allows for flexion of the rotational point of the guide wheel 130.

Figure 8:
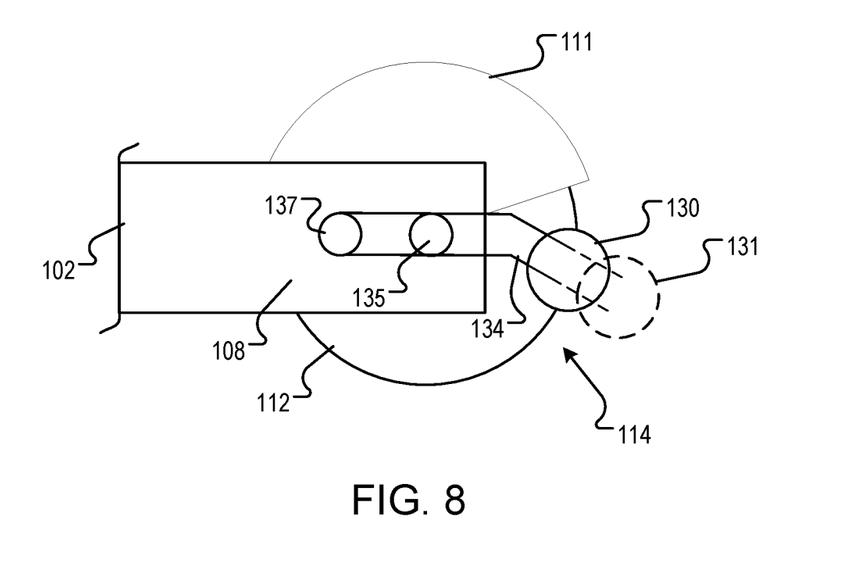
FIG. 8 is a side view of a guide wheel extension arm and positions of a guide roller relative to a rear drive wheel.

In other implementations, the arms may be rigidly attached, such as shown in FIG. 8. The rigid attachment may be made, for example, by two bolts 135 and 137. Furthermore, the relative position of the distal portion of arm 134 may vary relative to the back end of the wheel 112 along the range as shown in phantom in FIG. 8. For example, the extension arms have distal portion extending, in the direction of the longitudinal axis, toward a rear surface of the second drive wheel, and the guide wheels are attached to the distal portions such that their back portions extend beyond a back portion of the second drive wheel 112.

In some implementations, when the extension arm 134 is extended such that the entire rotational surface of the guide assembly 114 is beyond the surface of the rear drive wheel 112, either a guide wheel 130 or an optional roller 131 may be used. When a roller 131 is used an attached to the distal end of the extension arm 134, the roller 131 extends along the entire rotational axis of the guide roller assembly 114, and may optionally mate with a second arm 136 (not shown) on the other side of the rear drive wheel 112.

Other attachments may also be used for the guide roller assembly, such as a foldable attachment by which the guide wheels may fold approximately 180 degrees and rest within the deck 102 when the rider is riding the portable conveyance 100.

Figure 9:
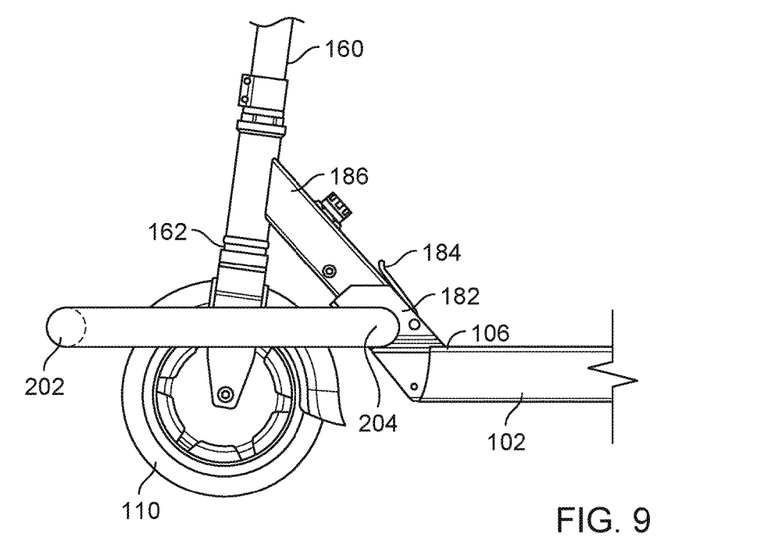
FIG. 9 is a side view illustration of the portable conveyance in a riding configuration with a rigidly attached tow handle.
Figure 10:
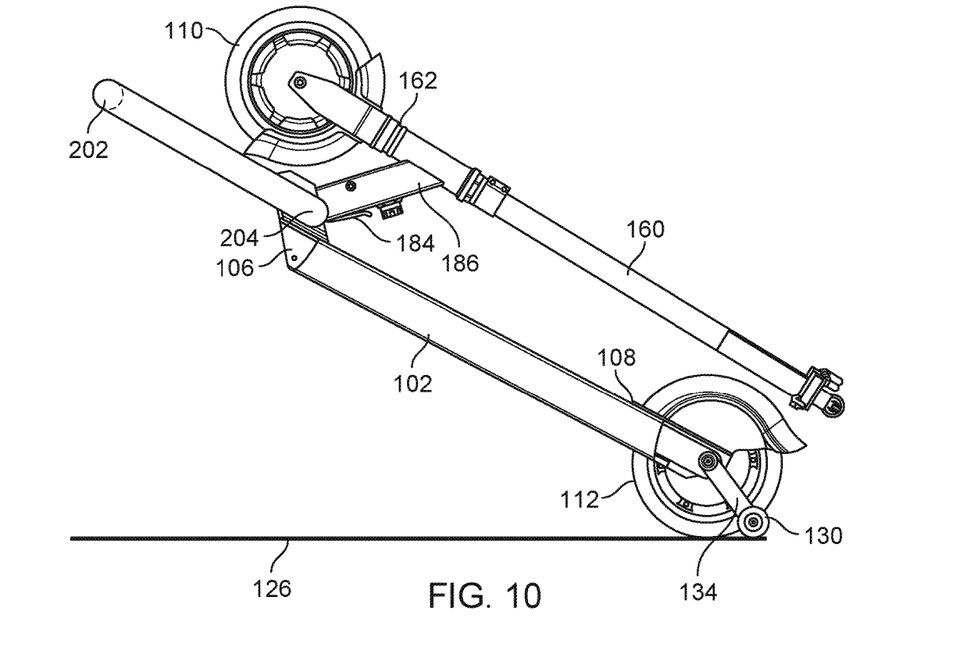
FIG. 10 is a side view illustration of the portable conveyance in a towing configuration with the rigidly attached tow handle.

Finally, while the example implementations above describe an extendable tow handle, other tow handles can also be used. For example, the tow handle can be rigidly attached to the deck 102 and extend, in the direction of the longitudinal axis, beyond a front surface of the first drive wheel. One such implementation is shown in FIGS. 9 and 10, which respectively depict the portable conveyance 100 in a riding configuration with a rigidly attached tow handle 202, and in a towing configuration with the rigidly attached tow handle 202. The distal portion 204 of the tow handle 202 is attached to the deck 102. The tow handle 202 may be a bar that entirely surrounds the front wheel 110 and that defines an interior circumference that allows for completely rotation of the front wheel 110 when in the riding position, and also allows for front drive wheel 110 to rotate upward to place the steering tube 160 in the stowed position. Alternately, the tow handle 202 need not entirely surround the front drive wheel 110.

Figure 11:
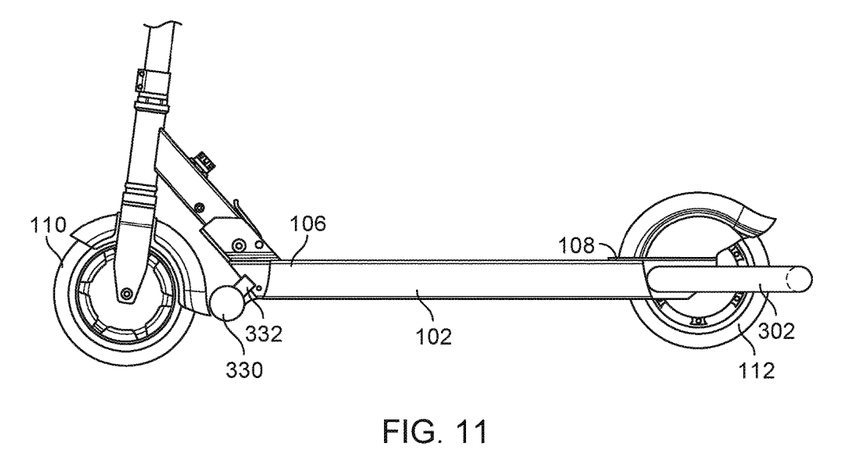
FIG. 11 is a side view illustration of another implementation of the portable conveyance in a riding configuration.
Figure 12:
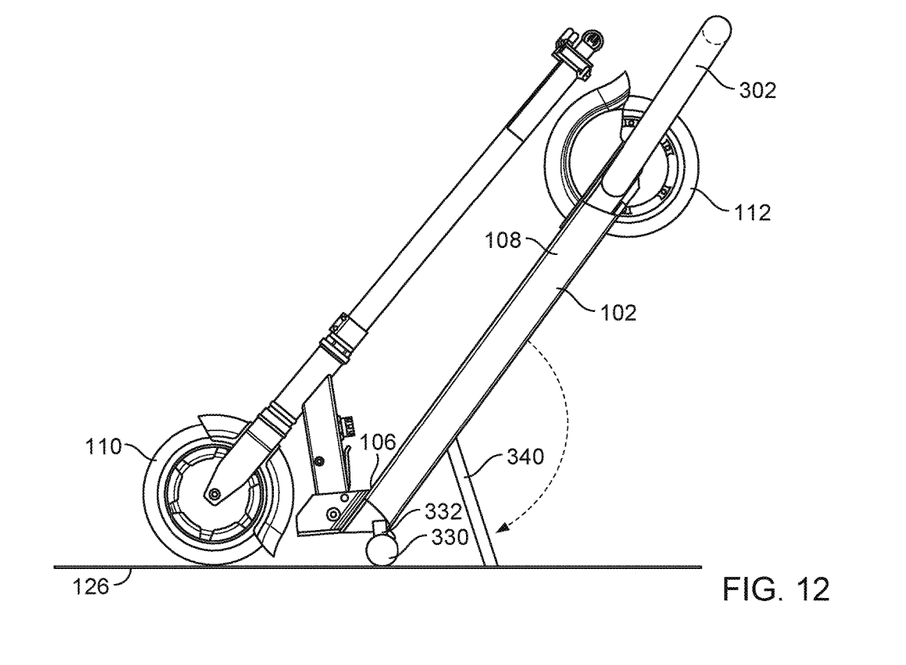
FIG. 12 is a side view illustration of another implementation of the portable conveyance in a towing configuration.

The implementations in FIGS. 1-10 depict a guide roller assembly attached near the rear drive wheel 112 of the conveyance 100. However, in another implementation, the guide roller assembly may be attached proximate to the front drive wheel 110, and the tow handle 302 attached to the opposite end of the conveyance 100, proximate to the rear drive wheel 112. FIGS. 11 and 12 depict an example of such an implementation. In particular, FIG. 11 is a side view illustration of the implementation in a riding configuration, and FIG. 12 is a side view illustration of the implementation in a towing configuration.

In FIG. 11, a guide wheel 330 is mounted on an extension arm 322 that, in turn, is attached to the front end 106 of the deck. A second guide wheel and extension arm (not shown) are likewise mounted on the other side of the front end 106 of the deck 102. Near the back end 108 of the deck 102 a tow handle 302 is attached. The tow handle 302 may be a bar that entirely surrounds the rear wheel 112 and that defines an interior circumference that allows for rotation of the rear when in the riding position. The tow handle 302 need not entirely surround the rear drive wheel 112, and may be extendible in a direction along the longitudinal axis of the deck 102 so that a variety of tow handle 102 positions may be accommodated.

The deck 102 may include an optional support stand 340 that rotates downward as shown in FIG. 12 for vertical storage of the conveyance 100. When not in use, the support stand 340 folds into the bottom of the deck and locks into a stored position.

While this specification contains many specific implementation details, these should not be construed as limitations on the scope of any inventions or of what may be claimed, but rather as descriptions of features specific to particular embodiments of particular inventions. The dimensions described and/or shown are illustrative, and dimensions may vary from those described and/or shown.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims.

What is claimed is:

1. A portable conveyance, comprising:
a deck defining a longitudinal axis and first and second ends disposed along the longitudinal axis;
a front drive wheel proximately disposed to the first end of the deck and a rear drive wheel attached proximate to a second end of the deck, and wherein the deck defines a substantially planar support surface upon which a rider of the personal conveyance is supported while riding the personal conveyance;
a guide roller assembly attached proximate to the rear drive wheel, wherein the guide roller assembly has a first rotational axis and the rear drive wheel rotates about a second rotational axis different from the first rotational axis and parallel to the first rotational axis, such that the guide roller assembly is not in contact with a substantially flat surface when the first and rear drive wheels are in contact with the substantially flat surface, and the guide roller assembly is in rotational contact with the surface when the deck is lifted into a towing position;
a steering tube having a first end and a second end, wherein:

a steering handle is attached to the second end of the steering tube;
the steering tube is pivotally attached to the first end of the deck; and
a steering tube locking apparatus that locks the steering tube in a drive position and in a separate, stowed position, wherein in the drive position the front drive wheel is operatively positioned to be in contact with the substantially flat surface with the rear drive wheel, and wherein in the stowed position the steering handle, the first guide wheel and the second guide wheel define at least a three-point support stand on which the portable conveyance may be vertically stowed.

2. The portable conveyance of claim 1, wherein:
the guide roller assembly comprises:
a first guide wheel attached proximate to the rear drive wheel on a first side of the rear drive wheel; and
a second guide wheel attached proximate to the rear drive wheel on a second side of the rear drive wheel that is opposite the first side of the rear drive wheel;
wherein:
the first and second guide wheels rotate about the first rotational axis; and
the first and second guide wheels are attached proximate to the rear drive wheel such that the first and second guide wheels are not in contact with a substantially flat surface when the first and rear drive wheels are in contact with the substantially flat surface, and the first and second guide wheels and the rear drive wheel are in contact with the surface when the deck is lifted into a towing position.

3. The portable conveyance of claim 2, further comprising a tow handle mounted proximate to the front drive wheel, wherein the tow handle facilitates the lifting of the deck into the towing position.

4. The portable conveyance of claim 3, wherein:
the tow handle extends from the first end of the deck from the stored position to the extended position;
the steering tube further comprises a pivot arm having a first end rigidly connected to the steering tube and a second end pivotally attached to the first end of the deck, and when the steering tube is locked in the drive position the front drive wheel is separated from the first end of the deck by a first offset distance and from the tow handle by a second offset distance.

5. The portable conveyance of claim 4, wherein the second offset distance is less than the first offset distance.

6. The portable conveyance of claim 3, wherein:
the tow handle is rigidly attached to the deck and extends, in the direction of the longitudinal axis, beyond a front surface of the front drive wheel.

7. The portable conveyance of claim 2, wherein the guide roller assembly further comprises:
a first extension arm attached to a first side of the of the second end of the deck and having a first distal portion extending beyond the second end of the deck;
a second extension arm attached to a second side of the of the second end of the deck and having a second distal portion extending beyond the second end of the deck; and
wherein the first guide wheel is attached to the first distal portion of the first extension, and the second guide wheel is attached to the second distal portion of second extension.

8. The portable conveyance of claim 7, wherein the first and second extension arms are rigidly attached to the first and second sides of the deck.

9. The portable conveyance of claim 7, wherein the first and second extension arms are flexibly attached to the first and second sides of the deck.

10. The portable conveyance of claim 9, wherein the first and second extension arms are foldably attached to the first and second sides of the deck, and wherein the first and second extension arms foldably extend outward so that back portions of the first and second guide wheels extends beyond a back portion of the rear drive wheel.

11. The portable conveyance of claim 2, wherein the guide roller assembly further comprises:
a first extension arm attached to a first side of the of the second end of the deck and having a first distal portion extending, in the direction of the longitudinal axis, toward a rear surface of the rear drive wheel;
a second extension arm attached to a second side of the second end of the deck and having a second distal portion extending, the direction of the longitudinal axis, toward the rear surface of the rear drive wheel; and
wherein when the first guide wheel is attached to the first distal portion of the first extension, and the second guide wheel is attached to the second distal portion of second extension, a back portion of the first guide wheel extends beyond a back portion of the rear drive wheel, and a back portion of the second guide wheel extends beyond a back portion of the rear drive wheel.

12. The portable conveyance of claim 1, wherein:
the guide roller assembly comprises:
a first extension arm attached to a first side of the of the second end of the deck and having a first distal portion extending, in the direction of the longitudinal axis, beyond a rear surface of the rear drive wheel;
a roller rotationally connected to the first distal portion of the first extension arm.

13. The portable conveyance of claim 12, further comprising:
a second extension arm attached to a second side of the of the second end of the deck and having a second distal portion extending, the direction of the longitudinal axis, beyond the rear surface of the rear drive wheel; and
wherein the roller is also rotationally connected to the second distal portion of the second extension arm.

14. The portable conveyance of claim 1, wherein the front drive wheel is attached to the first end of the steering tube.

15. The portable conveyance of claim 1, wherein the three-point support stand defined by the steering handle, the first guide wheel and the second guide wheel precludes the rear drive wheel from contacting the substantially flat surface when the portable conveyance is vertically stowed.

* * * * *

UNITED STATES PATENT AND TRADEMARK OFFICE
CERTIFICATE OF CORRECTION

PATENT NO. : 9,586,643 B2  
APPLICATION NO. : 15/183299  
DATED : March 7, 2017  
INVENTOR(S) : Robert McCormick et al.

Page 1 of 1

It is certified that error appears in the above-identified patent and that said Letters Patent is hereby corrected as shown below:

In the Claims

Column 8, Line 54, Claim 7 – delete "of the of the" and insert -- of the --, therefor.

Column 8, Line 57-58, Claim 7 – delete "of the of the" and insert -- of the --, therefor.

Column 9, Line 11, Claim 11 – delete "of the of the" and insert -- of the --, therefor.

Column 10, Line 3, Claim 12 – delete "of the of the" and insert -- of the --, therefor.

Column 10, Line 12-13, Claim 13 – delete "of the of the" and insert -- of the --, therefor.

Signed and Sealed this  
Ninth Day of May, 2017

Michelle K. Lee  
*Director of the United States Patent and Trademark Office*